(12) United States Patent
Sa et al.

(10) Patent No.: US 10,397,169 B2
(45) Date of Patent: Aug. 27, 2019

(54) SYSTEMS AND METHODS FOR PROVIDING COMMUNICATION ITEMS FROM AN ENTITY ASSOCIATED WITH A SOCIAL NETWORKING SYSTEM

(71) Applicant: Facebook, Inc., Menlo Park, CA (US)

(72) Inventors: Brian Paihan Sa, Irvine, CA (US); Eytan Bakshy, San Francisco, CA (US); Alexander Kalicki, New York, NY (US)

(73) Assignee: Facebook, Inc., Menlo Park, CA (US)

( * ) Notice: Subject to any disclaimer, the term of this patent is extended or adjusted under 35 U.S.C. 154(b) by 196 days.

(21) Appl. No.: 15/285,300

(22) Filed: Oct. 4, 2016

(65) Prior Publication Data
US 2018/0097769 A1    Apr. 5, 2018

(51) Int. Cl.
| | | |
|---|---|---|
| *G06F 15/16* | (2006.01) | |
| *H04L 12/58* | (2006.01) | |
| *H04L 29/08* | (2006.01) | |
| *G06Q 50/00* | (2012.01) | |
| *H04L 29/06* | (2006.01) | |

(52) U.S. Cl.
CPC ............. *H04L 51/32* (2013.01); *G06Q 50/01* (2013.01); *H04L 67/22* (2013.01); *H04L 69/24* (2013.01)

(58) Field of Classification Search
USPC ........................................ 709/204, 205, 206
See application file for complete search history.

(56) References Cited

U.S. PATENT DOCUMENTS

| | | | | |
|---|---|---|---|---|
| 2008/0255937 | A1* | 10/2008 | Chang | G06Q 30/02 705/14.43 |
| 2009/0254397 | A1* | 10/2009 | Mahdian | G06Q 30/02 705/7.29 |
| 2010/0211453 | A1* | 8/2010 | Huang | G06Q 30/02 705/14.39 |
| 2012/0022937 | A1* | 1/2012 | Bhatia | G06Q 30/0241 705/14.41 |
| 2015/0142583 | A1* | 5/2015 | Shapiro | G06Q 30/0271 705/14.67 |
| 2015/0149273 | A1* | 5/2015 | Schweier | G06Q 30/0244 705/14.43 |
| 2016/0314491 | A1* | 10/2016 | Shani | G06Q 30/0244 |
| 2016/0328481 | A1* | 11/2016 | Marra | G06F 17/30867 |
| 2017/0186031 | A1* | 6/2017 | Kirti | G06Q 30/0246 |
| 2018/0091609 | A1* | 3/2018 | Xu | H04L 67/22 |

* cited by examiner

*Primary Examiner* — Liang Che A Wang
(74) *Attorney, Agent, or Firm* — Sheppard Mullin Richter & Hampton LLP

(57) ABSTRACT

Systems, methods, and non-transitory computer readable media can define a communication item associated with a social networking system, including a plurality of parameters that are each associated with one or more possible values. A plurality of variants of the communication item can be determined based on values associated with the plurality of parameters. A first set of weights associated with the plurality of variants can be determined. Each weight in the first set of weights can be associated with a variant of the plurality of variants. Each variant of the plurality of variants can be provided to a proportion of a first group of users that corresponds to a weight in the first set of weights associated with the variant.

14 Claims, 9 Drawing Sheets

SYSTEMS AND METHODS FOR PROVIDING COMMUNICATION ITEMS FROM AN ENTITY ASSOCIATED WITH A SOCIAL NETWORKING SYSTEM

FIELD OF THE INVENTION

The present technology relates to the field of social networks. More particularly, the present technology relates to techniques for providing communications by entities associated with social networking systems.

BACKGROUND

Today, people often utilize computing devices (or systems) for a wide variety of purposes. Users can use their computing devices, for example, to interact with one another, create content, share content, and view content. In some cases, a user can utilize his or her computing device to access a social networking system (or service). The user can provide, post, share, and access various content items, such as status updates, images, videos, articles, and links, via the social networking system.

Interactions in a social networking system may involve various types of communication. Types of communication supported by a social networking system can include communications between users as well as communications between entities represented on the social networking system (e.g., pages, groups, etc.). Types of communications supported by a social networking system can also include communications between users and entities represented on the social networking system.

SUMMARY

Various embodiments of the present disclosure can include systems, methods, and non-transitory computer readable media configured to define a communication item associated with a social networking system, including a plurality of parameters that are each associated with one or more possible values. A plurality of variants of the communication item can be determined based on values associated with the plurality of parameters. A first set of weights associated with the plurality of variants can be determined, wherein each weight in the first set of weights is associated with a variant of the plurality of variants. Each variant of the plurality of variants can be provided to a proportion of a first group of users that corresponds to a weight in the first set of weights associated with the variant.

In some embodiments, the determining a plurality of variants of the communication item comprises generating a full factorial combination of the values associated with the plurality of parameters.

In certain embodiments, the plurality of parameters comprises one or more of: a title, a content, an action, or an image.

In an embodiment, weights in the first set of weights associated with the plurality of variants are equal.

In some embodiments, a second set of weights associated with the plurality of variants is determined, wherein each weight in the second set of weights associated with a variant of the plurality of variants, and each variant of the plurality of variants is provided to a proportion of a second group of users that corresponds to a weight in the second set of weights associated with the variant.

In certain embodiments, the determining the second set of weights associated with the plurality of variants is based on a probability of each variant optimizing a metric associated with the communication item.

In an embodiment, data relating to performance of the metric for each variant of the plurality of variants is obtained based on the providing of each variant of the plurality of variants to the proportion of the first group of users, and the probability of each variant optimizing the metric is determined based on the obtained data relating to the performance of the metric for each variant.

In some embodiments, a group of users to which none of the plurality of variants are displayed is determined.

In certain embodiments, the group of users to which none of the plurality of variants are displayed is associated with the first group of users.

In an embodiment, the providing each variant of the plurality of variants to the proportion of the first group of users comprises randomly assigning each variant to a user of the first group of users.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

Figure 1:
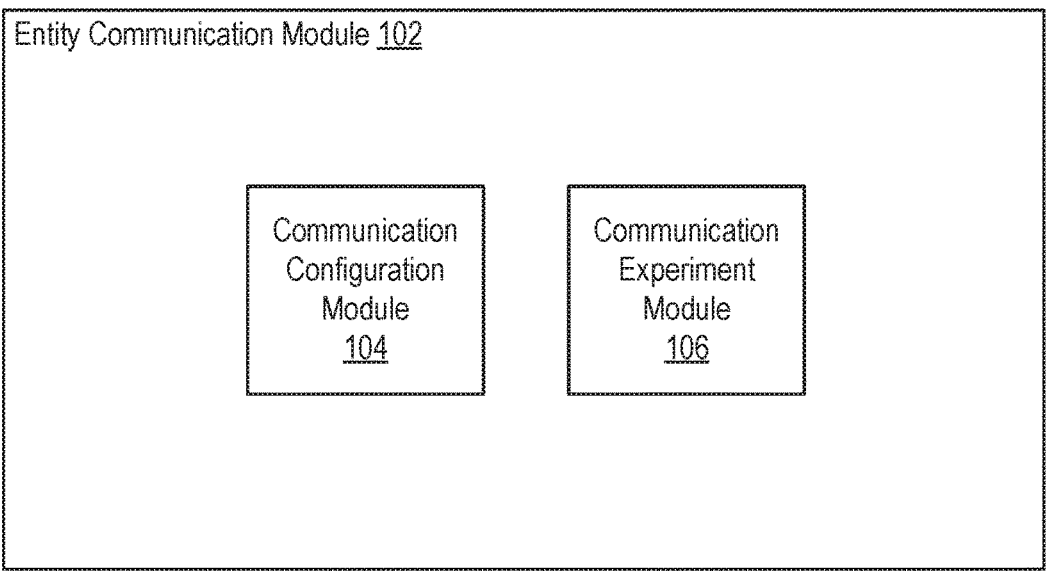
FIG. 1 illustrates a system including an example entity communication module configured to provide communication items from an entity associated with a social networking system, according to an embodiment of the present disclosure.
Figure 1:
Figure 1:
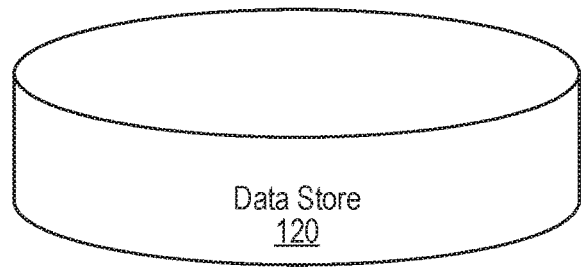

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Providing Communication Items from an Entity Associated with a Social Networking System People use computing devices (or systems) for a wide variety of purposes. Computing devices can provide different kinds of functionality. Users can utilize their computing devices to produce information, access information, and share information. In some cases, users can utilize computing devices to interact or engage with a conventional social networking system (e.g., a social networking service, a social network, etc.). A social networking system may provide user profiles for various users through which users may add connections, such as friends, or publish content items.

Interactions in a social networking system may involve various types of communication. Some types of communication supported by a social networking system can include communications from an entity associated with the social networking system to users of the social networking system. For example, an entity associated with the social networking system can be an organization that supports, administers, manages, controls, or otherwise provides the social networking system. A communication from the entity associated with the social networking system can include a message or information that the entity wants to provide to users. Conventional approaches specifically arising in the realm of computer technology may provide communications from the entity associated with the social networking system. However, conventional approaches may provide such communications without determining whether the communications are effective, for example, with respect to selected metrics that measure an extent to which the communications achieve an objective of the entity associated with the social networking system.

An improved approach rooted in computer technology can overcome the foregoing and other disadvantages associated with conventional approaches specifically arising in the realm of computer technology. Based on computer technology, the disclosed technology can provide communication items from an entity associated with a social networking system ("entity") to users of the social networking system and determine effective variants of communication items from the entity to provide to the users. A communication item from the entity ("communication item") can include any type of information that the entity wants to provide to users. For example, a communication item can encourage an action, suggest a functionality, promote a cause, gauge user sentiment, etc. A communication item can include various components, such as a text, an image, etc. A communication item can be associated with one or more parameters. A parameter can have one or more possible values associated with it, and can be set to a value that is selected from the possible values associated with the parameter. Examples of parameters can include a title, a content, an action (e.g., a primary action, a secondary action, etc.), an image, etc. The disclosed technology can generate one or more variants of a communication item based on possible values of one or more parameters associated with the communication item. Each variant of a communication item can be a specific combination of values of one or more parameters associated with the communication item. A communication item can be provided to a user by selecting and displaying a particular variant of one or more variants of the communication item. A communication item can also be associated with a metric, which can be related to an objective.

The disclosed technology can define an experiment to determine an effectiveness of variants of a communication item. The experiment can be performed in sequence in multiple sessions. A proportion of users to which to display a variant of the communication item in each session can be determined based on a weight associated with the variant. In an initial session of the experiment, each variant of the communication item can be displayed to a first group of users with an equal weight. The first group of users can be a subset of a relevant user population. For example, if there are four variants of the communication item, each variant can be displayed to 25% of users in the first group of users. Performance data of the variants with respect to a metric associated with the communication item can be collected and analyzed. For example, the performance data can be fit to a statistical model. The weights for the variants can be adjusted based on the performance data. For example, the weight of a variant that has a higher probability of improving the metric associated with the communication item can be adjusted to be higher than a current value of the weight, and the weight of a variant that has a lower probability of improving the metric can be adjusted to be lower than a current value of the weight. In a subsequent session, the variants can be displayed to a second group of users according to the adjusted weights. The second group of users can be another subset of the relevant user population. The process can be repeated until all users in the relevant population have been included in the experiment. For each session, a holdout group that includes one or more users to whom none of the variants are displayed can be determined. Performance data of the holdout group with respect to the metric can be compared to the performance data of the variants with respect to the metric. Over the sessions of the experiment, variants that are more likely to improve performance of the metric associated with the communication item can be displayed to a higher proportion of users.

In this manner, the disclosed technology can determine an effectiveness of variants of a communication item. In addition, the disclosed technology can increasingly display a more effective variant of a communication item to a higher portion or percentage of users. A communication item can be provided in a way that can increase performance of a metric associated with the communication item.

FIG. 1 illustrates an example system 100 including an example entity communication module 102 configured to provide communication items from an entity associated with a social networking system, according to an embodiment of the present disclosure. The entity communication module 102 can include a communication configuration module 104 and a communication experiment module 106. In some instances, the example system 100 can include at least one data store 120. The components (e.g., modules, elements, steps, blocks, etc.) shown in this figure and all figures herein are exemplary only, and other implementations may include additional, fewer, integrated, or different components. Some components may not be shown so as not to obscure relevant details. In various embodiments, one or more of the functionalities described in connection with the entity communication module 102 can be implemented in any suitable combinations.

The communication configuration module 104 can specify one or more parameters associated with a communication item. A communication item can include visual elements as well as action elements. Parameters associated with a communication item can correspond to visual elements or action elements. A parameter associated with a communication item can have one or more possible values associated with the parameter. In certain embodiments, a parameter can have subparameters associated with the parameter, and a subparameter can have one or more possible values associated with the subparameter. Subparameters associated with a communication item can also correspond to visual elements or action elements. The communication configuration module 104 can provide a user interface for specifying parameters and/or subparameters associated with a communication item.

Examples of parameters associated with a communication item can include a title, a content, an action (e.g., a primary action, a secondary action, etc.), and an image. A title parameter can indicate a title or short description that is displayed for the communication item. A content parameter can indicate a message or information that is displayed for the communication item. An action parameter can indicate an action associated with the communication item. Examples of an action associated with the communication item can include installing an application, accessing a link, displaying a dialog, etc. There can be more than one action parameter associated with a communication item. For example, a communication item can be associated with a primary action parameter and a secondary action parameter. In some embodiments, an action can be specified for a particular platform or operating system (OS). For example, the same type of action can be implemented in different ways on different operating systems, and the communication configuration module 104 can specify which action occurs for a particular OS. An image parameter can indicate an image that is displayed for the communication item. An image is provided as an example of media that can be displayed for the communication item, and other types of media, such as a video or an audio, can be used in place of or in addition to an image. Examples of parameters associated with a communication item above are provided for illustrative purposes, and other parameters can be specified for a communication item.

In some embodiments, parameters associated with a communication item can have values that are dynamically substituted, for example, at runtime. For example, a placeholder name or description can initially be assigned as the value of a parameter, and an actual value of the parameter can later be substituted for the placeholder name or description. Dynamically substituted values can be used when a value of a parameter is customized content, such as a user's profile photo, a user's name, etc. Similarly, subparameters associated with a parameter of a communication item can also have dynamically substituted values.

In certain embodiments, parameters associated with a communication item can be linked to each other. In some cases, values of some parameters associated with the communication item can be the same, and it may not be necessary to include duplicate values in determining variants of the communication item. Such parameters can be linked so that only unique possible values for the parameters are considered in determining the variants of the communication item. For example, a title parameter and a content parameter can have the same value (e.g., the same text), and the value of the title parameter and the content parameter can be considered only once to determine the variants of the communication item. Similarly, subparameters associated with a parameter of a communication item can be linked to each other, for example, when the subparameters have the same values.

Possible values of parameters of a communication item can be used to determine variants of the communication item. As explained above, each parameter associated with a communication item can have one or more possible values or options. For example, a title parameter can have a single title or have two different titles as possible values. As another example, an image parameter can have two images as possible values. Parameters associated with a communication item can be used determine variants of the communication item. For example, variants of a communication item can include a full factorial combination of all possible values of parameters associated with the communication item. As used herein, a full factorial combination of all possible values of parameters associated with a communication item refers to all unique combinations of the possible values of the parameters. For example, given possible parameter values a and b associated with a first parameter of a content item and possible parameter values c and d associated with a second parameter of the content item, a full factorial combination relating to the first parameter and the second parameter would result in the following combinations: {a, c}, {a, d}, {b, c}, and {b, d}. In some embodiments, values of some parameters can be the same, and these parameters can be linked as explained above. In such cases, a full factorial combination of all possible values of parameters associated with the communication item may not be needed. Accordingly, variants of a communication item can include a full factorial combination of all possible unique values of parameters associated with the communication item. If a parameter has one or more subparameters associated with the parameter, possible values of subparameters can also be used in determining variants of a communication item. For example, variants of a communication item can include a full factorial combination of all possible values of parameters and subparameters associated with the communication item. Determining variants of a communication item is explained in more detail below.

A communication item can be provided to users. For example, a selected variant of the communication item can be provided to users. The variant of the communication item can be displayed to users in user interfaces of various applications associated with the social networking system. The variant can be displayed at specific locations or positions within the user interfaces. For example, the variant of the communication item can be displayed in a user's feed in an application associated with the social networking system, and the variant of the communication item can be displayed above a most recent content item in the user's feed. As another example, the variant of the communication item can be provided in a chat application associated with the social networking system. A user can engage with a displayed variant of the communication item. For example, the user can select the displayed variant or a part of the displayed variant (e.g., a button, a link, an image, a video, etc.) by a click, a touch gesture, etc. Performance of a metric associated with the communication item can be measured, for example, based on users' engagement with displayed variants of the communication item, as explained further below.

The communication experiment module 106 can determine an effectiveness of variants of a communication item. For example, the communication experiment module 106 can define and perform an experiment to determine the effectiveness of the variants of the communication item. The experiment can be performed in multiple sessions to determine and adjust weights associated with the variants. The communication experiment module 106 is described in more detail herein.

In some embodiments, the entity communication module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the entity communication module 102 can be, in part or in whole, implemented as software running on one or more computing devices or systems, such as on a server system or a client computing device. In some instances, the entity communication module 102 can be, in part or in whole, implemented within or configured to operate in conjunction or be integrated with a social networking system (or service), such as a social networking system 630 of FIG. 6. Likewise, in some instances, the entity communication module 102 can be, in part or in whole, implemented within or configured to operate in conjunction or be integrated with a client computing device, such as the user device 610 of FIG. 6. For example, the entity communication module 102 can be implemented as or within a dedicated application (e.g., app), a program, or an applet running on a user computing device or client computing system. It should be understood that many variations are possible.

The data store 120 can be configured to store and maintain various types of data, such as the data relating to support of and operation of the entity communication module 102. The data maintained by the data store 120 can include, for example, information relating to communication items, parameters associated with communication items, metrics associated with communication items, information or criteria associated with communication items, variants of communication items, experiments associated with communication items, performance data associated with experiments associated with communication items, weights associated with variants of communication items, etc. The data store 120 also can maintain other information associated with a social networking system. The information associated with the social networking system can include data about users, social connections, social interactions, locations, geo-fenced areas, maps, places, events, groups, posts, communications, content, account settings, privacy settings, and a social graph. The social graph can reflect all entities of the social networking system and their interactions. As shown in the example system 100, the entity communication module 102 can be configured to communicate and/or operate with the data store 120. In some embodiments, the data store 120 can be a data store within a client computing device. In some embodiments, the data store 120 can be a data store of a server system in communication with the client computing device.

Figure 2:
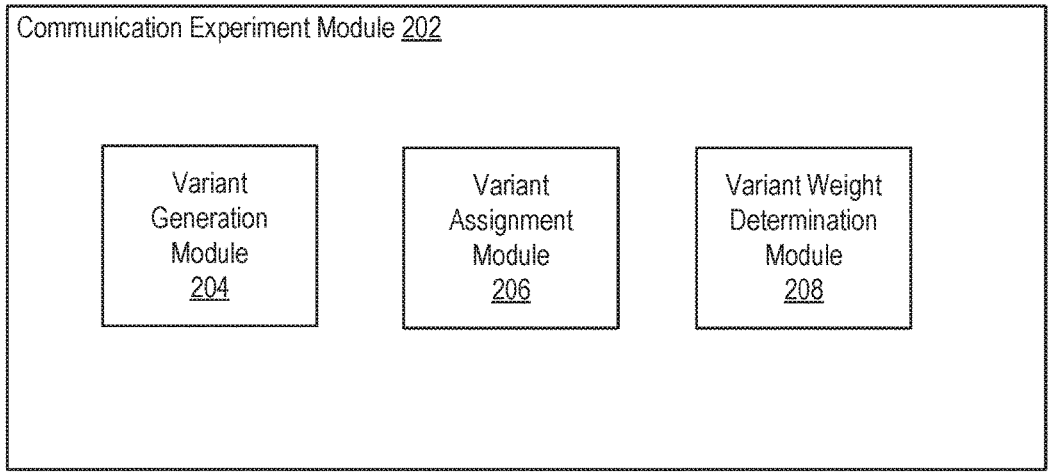
FIG. 2 illustrates an example communication experiment module configured to determine an effectiveness of variants of a communication item, according to an embodiment of the present disclosure.

FIG. 2 illustrates an example communication experiment module 202 configured to determine an effectiveness of variants of a communication item, according to an embodiment of the present disclosure. In some embodiments, the communication experiment module 106 of FIG. 1 can be implemented with the communication experiment module 202. As shown in the example of FIG. 2, the communication experiment module 202 can include a variant generation module 204, a variant assignment module 206, and a variant weight determination module 208.

The communication experiment module 202 can define an experiment to determine effectiveness of variants of a communication item. As mentioned above, the experiment can be performed in sequence in multiple sessions. A relevant user population can be determined for the experiment, and a group of users from the relevant user population can be included in each session. The experiment can be performed until all users in the relevant user population are included in the experiment.

The communication experiment module 202 can define various settings associated with the experiment. The communication experiment module 202 can provide a user interface for defining the various setting associated with the experiment. The settings can include one or more parameters associated with the communication item as described above. The settings can also include a metric associated with the communication item. The metric associated with the communication item can be optimized in order to determine an effectiveness of the variants of the communication item. For example, performance associated with the metric can be measured for a specific variant of the communication item. Examples of metrics can include a number of installs of an application, a number of likes, a number of comments, a number of connections, a click through rate (CTR), a dismiss rate, etc. In some cases, the metric associated with the communication item can be a combination of multiple metrics. The metric associated with the communication item can be a substitute or surrogate metric that is correlated with another metric of interest. For example, the substitute metric can be used to measure performance when it can be easier to directly observe performance of the substitute metric as compared to the metric of interest and when it may be known that the substitute metric correlates with the metric of interest.

The settings associated with the experiment can also include the following information or criteria. An application associated with a social networking system can indicate an application in which to provide the communication item. In addition to the application, a location within a user interface of the application can be specified for providing the communication item. A pacing of the communication item can indicate a frequency with which the communication item can be provided to a particular user (e.g., a frequency with which a variant of the communication item can be displayed to a particular user). A maximum number of times for providing the communication item can indicate a maximum number of times the communication item can be provided to a particular user (e.g., a maximum number of times a variant of the communication item can be displayed to a particular user). Targeting criteria can indicate characteristics associated with users, devices, and/or applications to be targeted by the communication item. For example, the targeting criteria can specify information such as a country of a user, a type of device, a type of device OS, a version of a device OS, a version of an application, etc. The targeting criteria can be used to identify the relevant user population for the experiment. A reach can indicate a number of users that can be reached by the communication item. A limit on the reach can include a maximum number of users that can be reached by the communication item, a geographical region (e.g., a country, a state, a city, etc.) that can be reached by the communication item, etc.

The settings associated with the experiment can include a number of users to be included in a session of the experiment. For example, the number of users can be indicated as a portion or a percentage of the relevant user population, by a number, etc. A number of sessions in the experiment can be determined based on the number of users included in a session.

The settings associated with the experiment can further include a holdout group. The holdout group can include one or more users to whom a communication item is not provided. For example, none of the variants of the communication item are displayed to the holdout group. The holdout group can be determined for each session of the experiment. For example, a number of users to be included in the holdout group for a session can be indicated as a portion or percentage of users included in the session. A holdout group can be determined when the metric associated with the communication item has some performance level associated with the metric even without providing the communication item. By designating the holdout group, performance of the metric for the variants can be compared to performance of the metric without the variants. In this way, incremental performance due to providing the communication item can be measured. Users in the holdout group can be excluded when users included in a session are assigned to the variants of the communication item.

After the experiment is defined, the experiment can be started to determine the effectiveness of the variants of the communication item. In some embodiments, there can be a test phase or a review phase prior to starting the experiment. For example, a test run can be performed for the experiment with a test group of users.

The variant generation module 204 can generate the variants of the communication item to be included in the experiment. As explained above, the variants of the communication item can be generated based on possible values of the parameters associated with the communication item. For example, the variants of the communication item can include a full factorial combination of all possible values of the parameters associated with the communication item. As explained above, some parameters can be linked, and in such cases, the variants of the communication item can include a full factorial combination of all possible unique values of the parameters associated with the communication item. If parameters have any subparameters associated with the parameters, possible values of the subparameters can also be used in generating the variants of the communication item.

The variant assignment module 206 can assign users in the experiment to different variants of the communication item. The variant assignment module 206 can assign users included in a session to a variant of the communication item based on a weight associated with the variant. As explained above, users in the holdout group for the session can be excluded from being assigned a variant of the communication item. For example, after excluding users in the holdout for the session from the users included in the session, remaining users for the session can be assigned to the variants of the communication item. Each variant of the communication item can have a weight associated with the variant that can indicate a probability of the variant improving the metric associated with the communication item. For example, the weight can indicate a probability of the variant being a best performing variant with respect to the metric out of all the variants of the communication item. A variant of the communication item can be assigned to a proportion or a percentage of the remaining users for the session that corresponds to the weight associated with the variant. For example, if the weight associated with the variant is 0.3, the variant can be displayed to 30% of the remaining users for the session.

The variant assignment module 206 can randomly assign a user to a variant of the communication item. In one example, a user can be assigned to a variant by mapping a user identifier (ID) associated with the user to a variant identifier (ID) associated with the variant. In some embodiments, the variant assignment module 206 can use a randomization seed to determine which variant of the communication item to assign to a user. In some cases, the communication item can be provided to a user more than once over time. In some embodiments, in order to prevent displaying the same variant of the communication item multiple times, a randomization seed can be used in determining a variant of the communication item to display to a user. In one example, the randomization seed can be based on a current time. By using the randomization seed, the variant assignment module 206 can increase a probability of displaying a different variant of the communication item to a user each time the communication item is provided to the user.

The variants of the communication item can be displayed to users based on assignments by the variant assignment module 206. For each session, assigned variants can be displayed to users included in the session. For each user, an assigned variant of the communication item can be displayed to the user in the application associated with the social networking system. The variant can be displayed at a specified location within a user interface of the application. The user can engage with the displayed variant, for example, by selecting the displayed variant or a part of the displayed variant. The user can engage with the displayed variant, for example, by a click, a touch gesture, etc. The variant assignment module 206 can keep track of whether users engage with their displayed variants. The variant assignment module 206 can obtain data relevant to measuring performance of the metric associated with the communication item from users. The variant assignment module 206 can obtain the data from users for each session. For example, if the metric associated with the communication item is the CTR, the variant assignment module 206 can obtain data about whether a user clicked through or otherwise selected the displayed variant of the communication item. The data from users can be aggregated in order to measure performance of the metric for the variants. The data from users can be provided to the variant weight determination module 208 for determining the weights associated with the variants, as described below. In some cases, the data from users can be provided to the variant weight determination module 208 in aggregated format. In one example, the data from users and/or the aggregated data can be provided as one or more vectors.

The variant weight determination module 208 can determine weights associated with the variants of the communication item. The variant weight determination module 208 can determine the weights associated with the variants for each session. Initially, the weights can be set to equal values. For example, if there are four variants of the communication item, the weights can each be set to 0.25. After a session of the experiment is completed, the weights can be adjusted based on performance of the metric for the variants in that session. The variant weight determination module 208 can determine the performance of the metric for each variant based on the data obtained from users for a session. For example, the variant weight determination module 208 can fit the data obtained from users for a session to a statistical model. As explained above, the weight associated with a variant can indicate a probability of the variant improving the metric associated with the communication item. Based on the performance of the metric for a variant, the variant weight determination module 208 can adjust the weight associated with the variant to be higher if the variant has a high probability of being the best performing variant. Similarly, the variant weight determination module 208 can adjust the weight associated with the variant to be lower if the variant has a low probability of being the best performing variant. In one example, the weights can be provided as a vector.

In some embodiments, various contexts can be considered in determining the weights associated with the variants. For example, contexts can be based on demographic information, such as a country, an age, a gender, etc. A context can have multiple possible values. The variant weight determination module 208 can determine a separate set of weights associated with the variants for each possible value of the context. For example, if the context is the country and has Country 1 and Country 2 as possible values, the variant weight determination module 208 can determine a first set of weights for Country 1, and the variant weight determination module 208 can determine a second set of weights for Country 2.

Figure 3A:
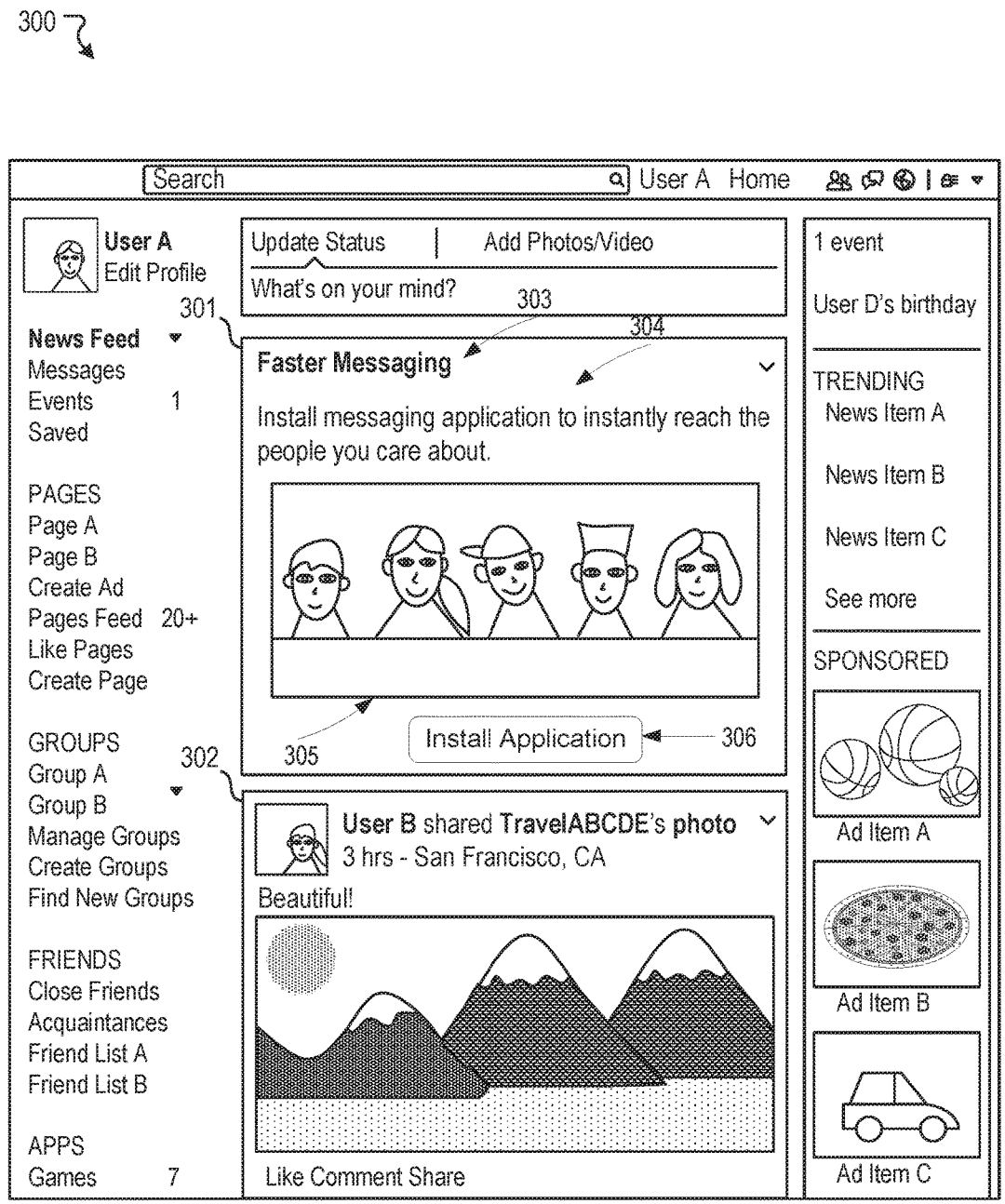
FIG. 3A illustrates an example user interface for providing communication items associated with a social networking system, according to an embodiment of the present disclosure.

FIG. 3A illustrates an example user interface 300 for providing communication items associated with a social networking system, according to an embodiment of the present disclosure. The user interface 300 displays a feed of a user. The feed of the user can include content items. In the example of FIG. 3A, a variant 301 of a communication item can be displayed at the top of the user's feed. For example, the variant 301 is displayed above a most recent content item 302 in the user's feed. The variant 301 can include a selected combination of values of parameters associated with the communication item. For example, the variant 301 can display a selected value of a title parameter 303, a selected value of a content parameter 304, a selected value of an image parameter 305, and a selected value of an action parameter 306 (e.g., a primary action parameter or a secondary action parameter). The selected value of the action parameter 306 can indicate an action to be performed when the user engages with the variant 301. The action associated with the variant 301 can be performed when a user interface element associated with the action is selected by the user. The user interface element associated with the action can include a button, a link, an image, a video, etc. In the example of FIG. 3A, the selected value of the title parameter 303 is "Faster messaging." The selected value of the content parameter 304 is "Install messaging application to instantly reach the people you care about." The selected value of the image parameter 305 is the displayed image. The selected value of the action parameter 306 is installing a messaging application. In the example of FIG. 3A, a button for installing the messaging application is provided to the user, and the messaging application can be installed when the button is clicked. All examples herein are provided for illustrative purposes, and there can be many variations and other possibilities.

Figure 3B:
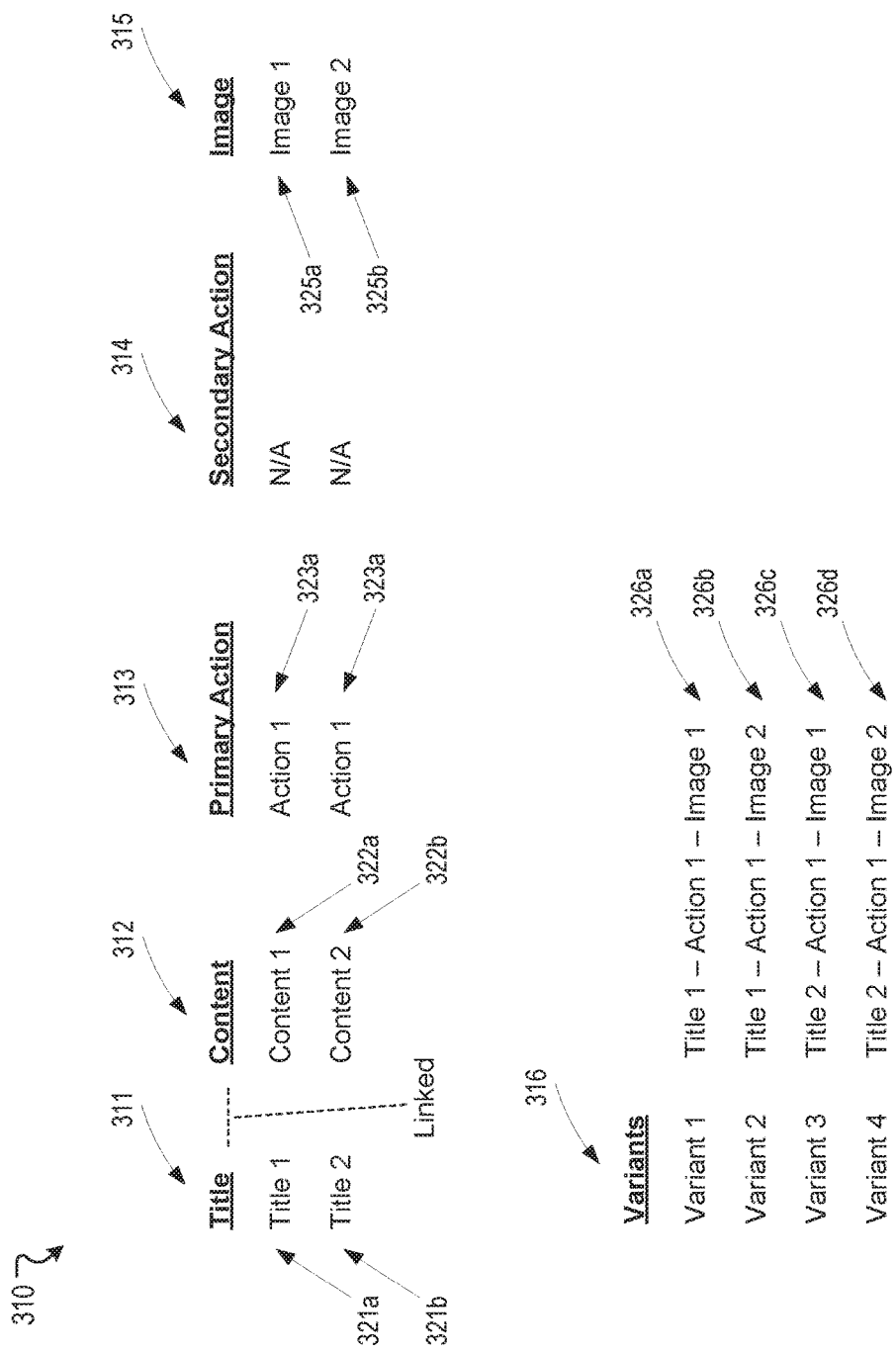
FIG. 3B illustrates an example scenario for determining variants of the communication item, according to an embodiment of the present disclosure.

FIG. 3B illustrates an example scenario 310 for determining variants of the communication item, according to an embodiment of the present disclosure. In the example of FIG. 3B, a communication item includes a title parameter 311, a content parameter 312, a primary action parameter 313, a secondary action parameter 314, and an image parameter 315. The title parameter 311 has two possible values: Title 1 321a and Title 2 321b. The content parameter 312 also has two possible values: Content 1 322a and Content 2 322b. The title parameter 311 and the content parameter 312 are linked. Title 1 and Content 1 are the same, and Title 2 and Content 2 are the same. For example, Title 1 and Content 1 are the same text, and Title 2 and Content 2 are the same text. The primary action parameter 313 has one possible value: Action 1 323a. The secondary action parameter 314 has no value associated with it, which is indicated as "N/A." The image parameter 315 has two possible values: Image 1 325a and Image 2 325b.

In the example of FIG. 3B, the variants 316 of the communication item can include a full factorial combination of all possible unique values of the title parameter 311, the content parameter 312, the primary action parameter 313, the secondary action parameter 314, and the image parameter 315. Since the title parameter 311 and the content parameter 312 are linked, either the values of the title parameter 311 or the values of the content parameter 312, but not both, are used in determining the variants 316 of the communication item. In the example of FIG. 3B, the values of the title parameter 311 are used in determining the variants 316. The variants 316 of the communication item include Variant 1 326a, Variant 2 326b, Variant 3 326c, and Variant 4 326d. Variant 1 326a is a combination of Title 1, Action 1, and Image 1. Variant 2 326b is a combination of Title 1, Action 1, and Image 2. Variant 3 326c is a combination of Title 2, Action 1, and Image 1. Variant 4 326d is a combination of Title 2, Action 1, and Image 2.

Figure 3C:
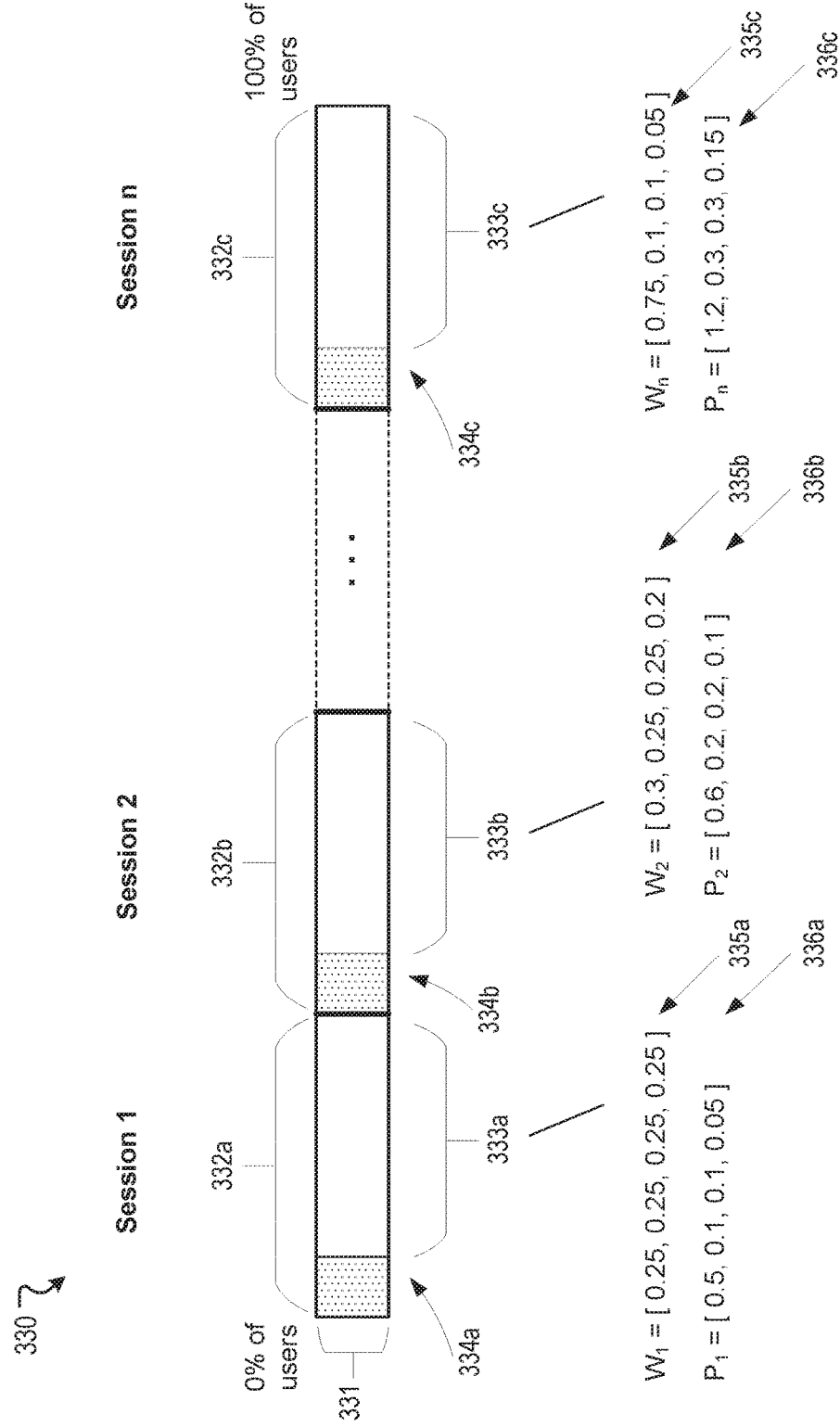
FIG. 3C illustrates an example scenario for assigning users to variants of a communication item, according to an embodiment of the present disclosure.

FIG. 3C illustrates an example scenario 330 for assigning users to variants of a communication item, according to an embodiment of the present disclosure. In the example of FIG. 3C, an experiment to determine an effectiveness of the variants of the communication item can include Session 1 through Session n. A portion of users in the relevant user population 331 for the experiment can be assigned to each session in the experiment. For example, a first group of users 332a can be included in Session 1, a second group of users 332b can be included in Session 2, and so forth. A last group of users 332c can be included in Session n, which is the last session of the experiment. The experiment can conclude when all users in the relevant user population 331 have been included in a session of the experiment. A portion of users in each group of users 332a, 332b, 332c can be included in a respective holdout group 334a, 334b, 334c for the corresponding session. The holdout group 334a, 334b, 334c can be excluded from being assigned to the variants of the communication item.

Remaining users 333a, 333b, 333c after excluding the holdout group 334a, 334b, 334c from each respective group 332a, 332b, 332c can be assigned to different variants of the communication item based on weights associated with the variants. The variants can be the same as the variants 316 in the example of FIG. 3B and can include Variant 1, Variant 2, Variant 3, and Variant 4. Accordingly, the remaining users 333a, 333b, 33c are assigned to the four variants of the communication item. The weights for Session 1 335a can be equal. In the example of FIG. 3C, the weights for Session 1 335a are indicated as a vector: W1=[0.25, 0.25, 0.25, 0.25]. The weight for each of the four variants is set to 0.25. After Session 1 is completed, performance of a metric associated with the communication item for the variants can be determined for Session 1. In the example of FIG. 3C, the performance of the metric for the variants for Session 1 336a is provided as a vector: $P_1$=[0.5, 0.1, 0.1, 0.05]. Four values in vector $P_1$ indicate performance of the metric for each of the four variants. The weights for Session 2 335b can be determined based on the values of vector $P_1$. The weights for Session 2 335 can be indicated as a vector $W_2$. Since the performance of the metric is highest for Variant 1 in $P_1$, the weight for Variant 1 in $W_2$ is adjusted to be higher. The weights for other variants are adjusted to be lower since the performance of the metric is lower for the other variants. After Session 2 is completed, performance of the metric for the variants can be determined for Session 2. The performance of the metric for Session 2 336*b* can be provided as a vector $P_2$, which can be used to determine the weights for a session subsequent session to Session 2. The process can be repeated until the weights for Session n 335*c* are determined based on performance of the metric for the variants from a session previous to Session n. Performance of the metric for the variants for Session n 336*c* can be provided as a vector $P_n$. In this way, the weights associated with the variants can be adjusted based on the performance of the metrics for the variants over the sessions of the experiment, and the variant(s) that have a high probability of improving the metric can be displayed to an increasingly higher proportion of users in the relevant user population over time.

In the examples of FIGS. 3B and 3C, four variants are tested in the experiment, but a number of variants that are tested in the experiment can be adjusted as appropriate. If a large number of variants are tested in the experiment, performance of the metric may not provide statistically significant information. Accordingly, the number of variants tested in the experiment can be selected to achieve statistical significance. A number of users included in the relevant user population can also be adjusted as appropriate. If the number of users included in the relevant user population is too low, the performance of the metric may not provide statistically significant information. The relevant user population and/or the number of users in the relevant user population can be selected to achieve statistical significance.

Figure 4:
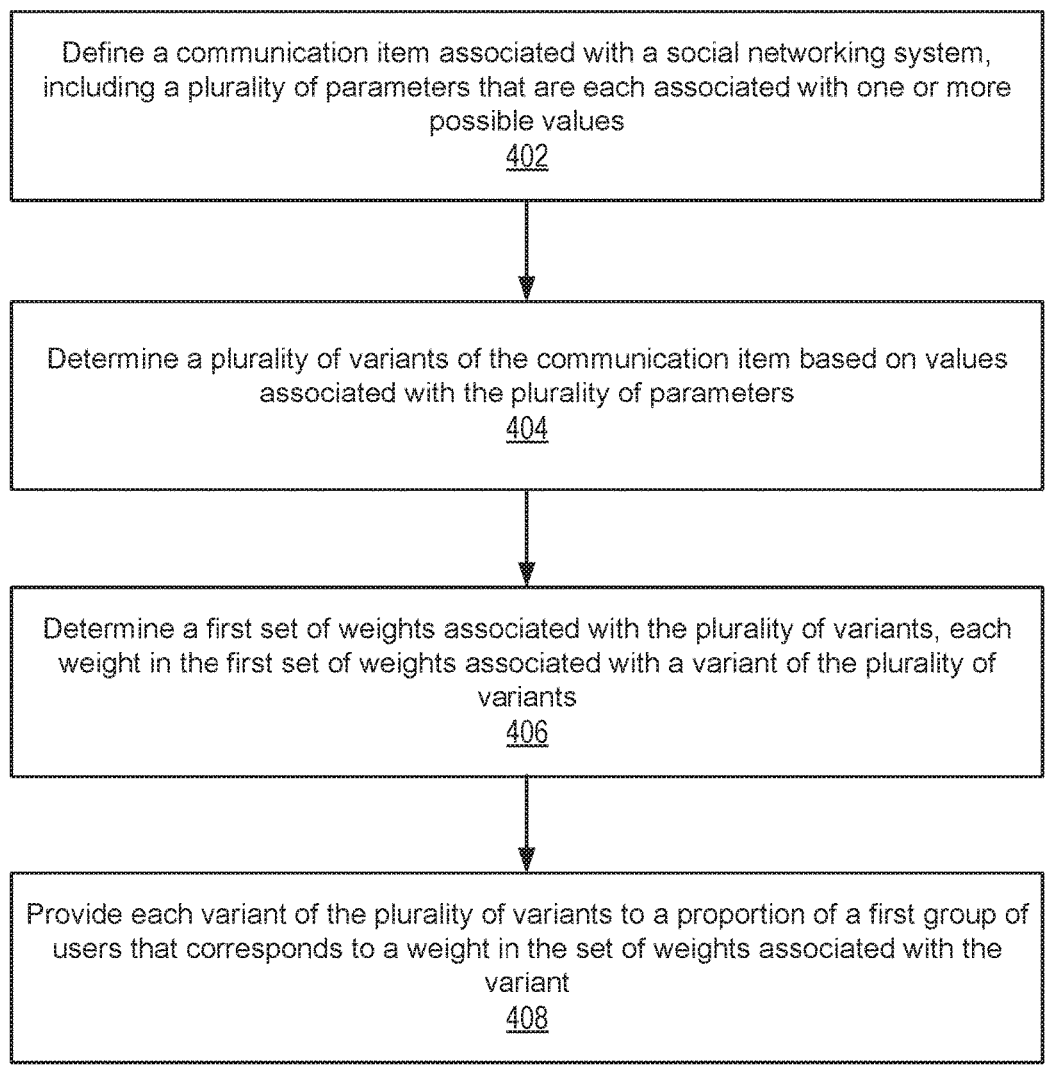
FIG. 4 illustrates an example first method for providing communication items from an entity associated with a social networking system, according to an embodiment of the present disclosure.

FIG. 4 illustrates an example first method 400 for providing communication items from an entity associated with a social networking system, according to an embodiment of the present disclosure. It should be understood that there can be additional, fewer, or alternative steps performed in similar or alternative orders, or in parallel, based on the various features and embodiments discussed herein unless otherwise stated.

At block 402, the example method 400 can define a communication item associated with a social networking system, including a plurality of parameters that are each associated with one or more possible values. At block 404, the example method 400 can determine a plurality of variants of the communication item based on values associated with the plurality of parameters. At block 406, the example method 400 can determine a first set of weights associated with the plurality of variants. Each weight in the first set of weights can be associated with a variant of the plurality of variants. At block 408, the example method 400 can provide each variant of the plurality of variants to a proportion of a first group of users that corresponds to a weight in the first set of weights associated with the variant. Other suitable techniques that incorporate various features and embodiments of the present disclosure are possible.

Figure 5:
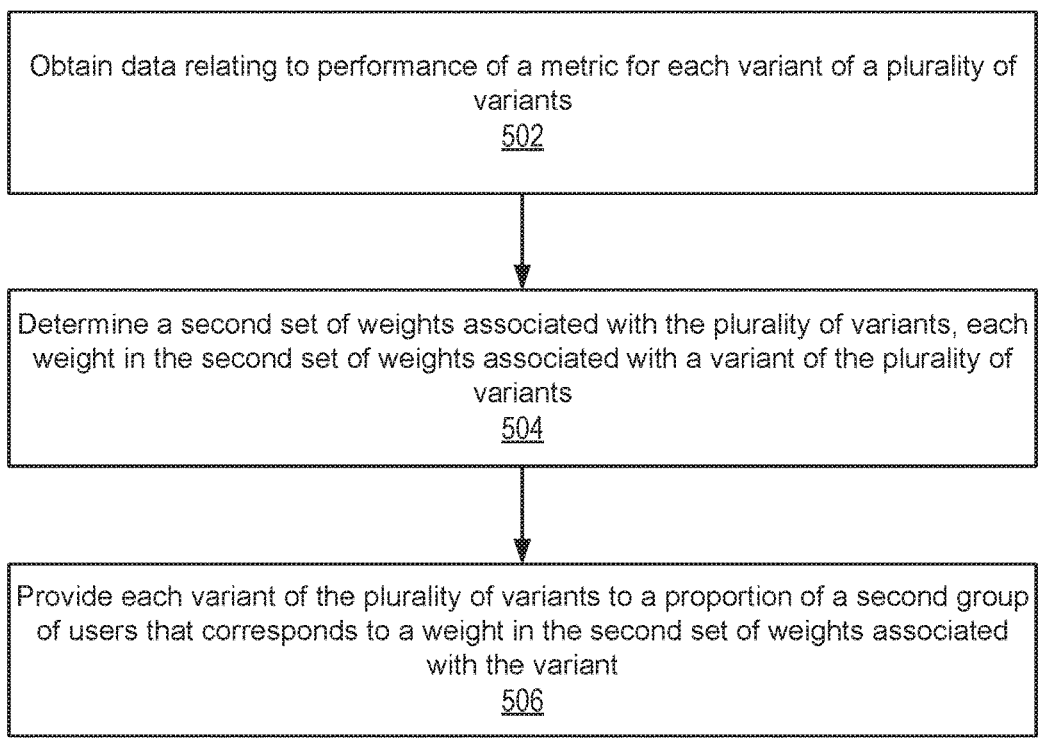
FIG. 5 illustrates an example second method for providing communication items from an entity associated with a social networking system, according to an embodiment of the present disclosure.

FIG. 5 illustrates an example second method 500 for providing communication items from an entity associated with a social networking system, according to an embodiment of the present disclosure. It should be understood that there can be additional, fewer, or alternative steps performed in similar or alternative orders, or in parallel, based on the various features and embodiments discussed herein unless otherwise stated. Certain steps of the method 500 may be performed in combination with the example method 400 explained above.

At block 502, the example method 500 can obtain data relating to performance of a metric for each variant of a plurality of variants. The plurality of variants can be similar to the plurality of variants explained in connection with FIG. 4. The metric can be associated with the communication item explained in connection with FIG. 4. The data relating to the performance of the metric for each variant of the plurality of variants can be obtained based on the providing of each variant of the plurality of variants to the proportion of the first group of users explained in connection with FIG. 4. At block 504, the example method 500 can determine a second set of weights associated with the plurality of variants. Each weight in the second set of weights can be associated with a variant of the plurality of variants. The determination of the second set of weights associated with the plurality of variants can be based on a probability of each variant optimizing the metric. The probability of each variant optimizing the metric can be determined based on the obtained data relating to the performance of the metric for each variant. At block 506, the example method 500 can provide each variant of the plurality of variants to a proportion of a second group of users that corresponds to a weight in the second set of weights associated with the variant. Other suitable techniques that incorporate various features and embodiments of the present disclosure are possible.

It is contemplated that there can be many other uses, applications, features, possibilities, and/or variations associated with various embodiments of the present disclosure. For example, users can, in some cases, choose whether or not to opt-in to utilize the disclosed technology. The disclosed technology can, for instance, also ensure that various privacy settings, preferences, and configurations are maintained and can prevent private information from being divulged. In another example, various embodiments of the present disclosure can learn, improve, and/or be refined over time.

Social Networking System—Example Implementation

Figure 6:
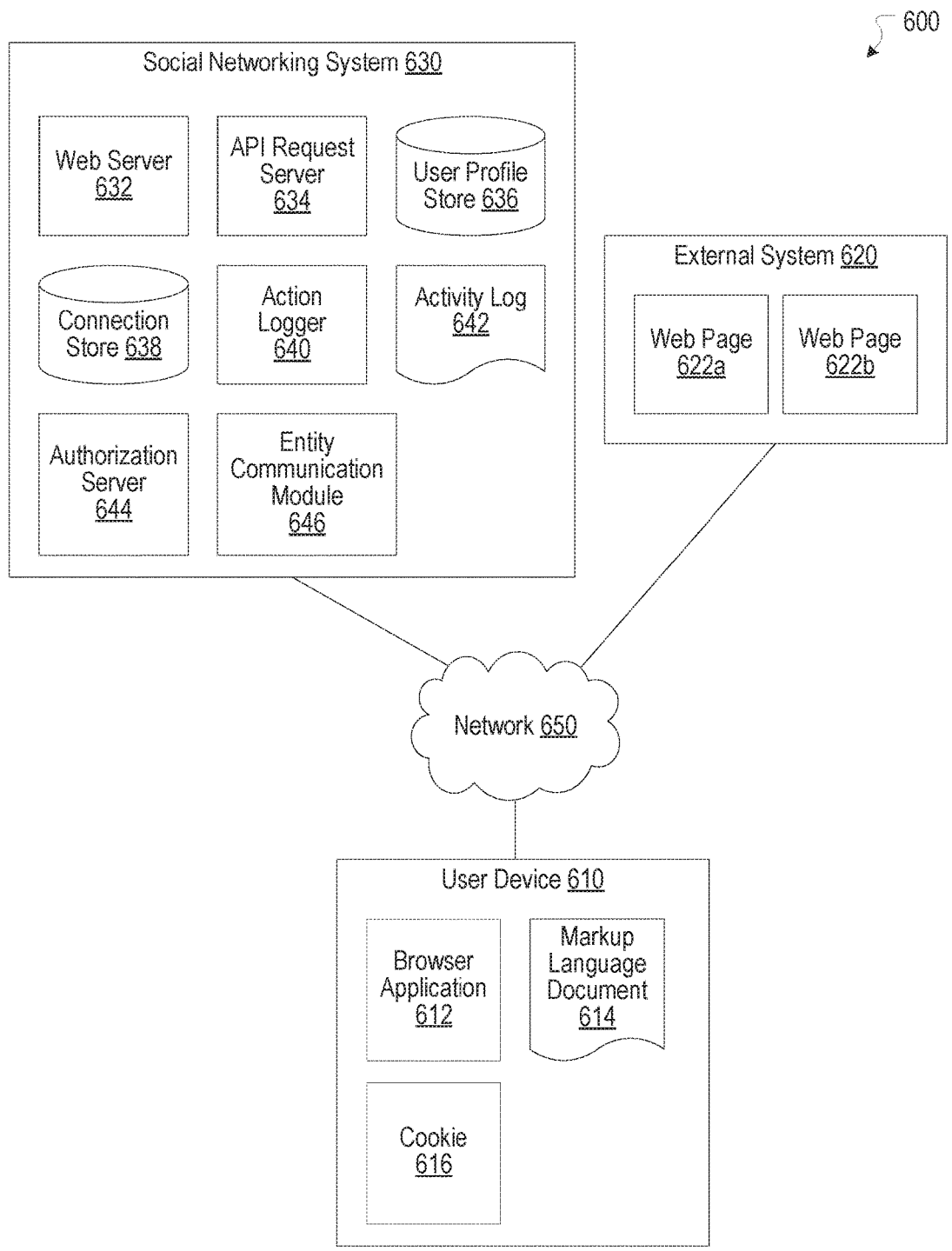
FIG. 6 illustrates a network diagram of an example system that can be utilized in various scenarios, according to an embodiment of the present disclosure.

FIG. 6 illustrates a network diagram of an example system 600 that can be utilized in various scenarios, in accordance with an embodiment of the present disclosure. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices that can receive input from a user and transmit and receive data via the network 650. In one embodiment, the user device 610 is a conventional computer system executing, for example, a Microsoft Windows compatible operating system (OS), Apple OS X, and/or a Linux distribution.

In another embodiment, the user device 610 can be a device having computer functionality, such as a smart-phone, a tablet, a personal digital assistant (PDA), a mobile telephone, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the SilverLight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622a within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include an entity communication module 646. The entity communication module 646 can be implemented with the entity communication module 102, as discussed in more detail herein. In some embodiments, one or more functionalities of the entity communication module 646 can be implemented in the user device 610.

Hardware Implementation

Figure 7:
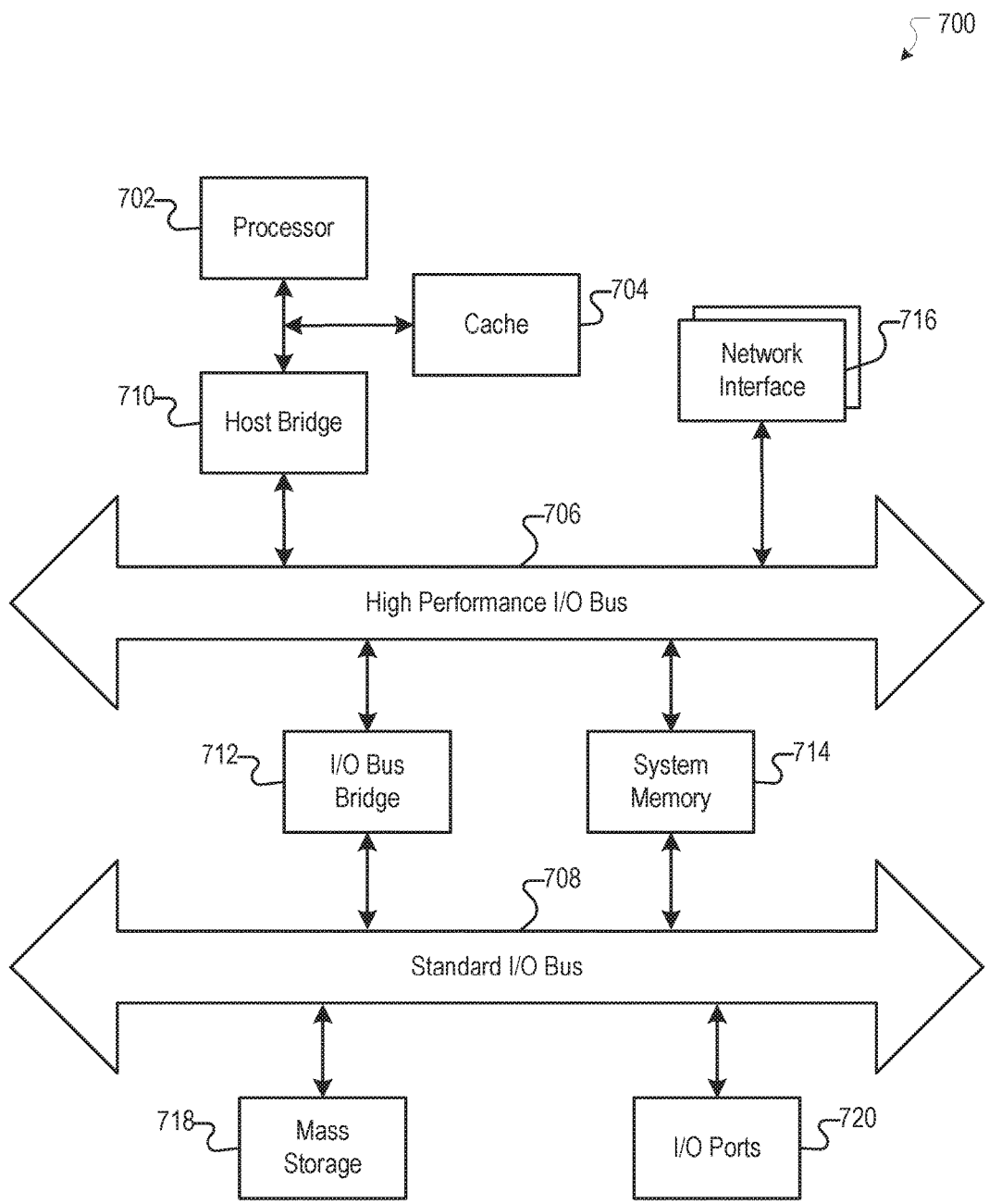
FIG. 7 illustrates an example of a computer system that can be utilized in various scenarios, according to an embodiment of the present disclosure.

The foregoing processes and features can be implemented by a wide variety of machine and computer system architectures and in a wide variety of network and computing environments. FIG. 7 illustrates an example of a computer system 700 that may be used to implement one or more of the embodiments described herein in accordance with an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 720, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   defining, by a computing system, a communication item associated with a social networking system, including a plurality of parameters that are each associated with one or more possible values;
   generating, by the computing system, a plurality of variants of the communication item on the social networking system based on a full factorial combination of values associated with the plurality of parameters;
   determining, by the computing system, a first set of weights associated with the plurality of variants, each weight in the first set of weights associated with a variant of the plurality of variants;
   providing, by the computing system, each variant of the plurality of variants to a proportion of a first group of users that corresponds to a weight in the first set of weights associated with the variant;
   obtaining, by the computing system, data relating to performance of each variant on a corresponding proportion of the first group;
   determining, by the computing system, a second set of weights associated with the plurality of variants, each weight in the second set of weights associated with a variant of the plurality of variants and a weight in the first set of weights associated with the variant, wherein each weight in the second set is determined based on the associated weight in the first set of weights and the performance of the associated variant from the first group of users; and
   providing, by the computing system, each variant of the plurality of variants on the social networking system to a proportion of a second group of users that corresponds to a weight in the second set of weights associated with the variant.

2. The computer-implemented method of claim 1, wherein the plurality of parameters comprises one or more of: a title, a content, an action, or an image.

3. The computer-implemented method of claim 1, wherein the weights in the first set of weights associated with the plurality of variants are equal.

4. The computer-implemented method of claim 1, wherein the determining the second set of weights associated with the plurality of variants is based on a probability of each variant optimizing a metric associated with the communication item, wherein the probability of each variant optimizing the metric is determined based on user engagement with the plurality of variants by the proportion of the first group of users.

5. The computer-implemented method of claim 4, wherein the performance of the metric for the provided variant is based on the user engagement with the provided variant by the proportion of the first group of users associated with the provided variant.

6. The computer-implemented method of claim 1, further comprising determining a group of users to which none of the plurality of variants are displayed.

7. The computer-implemented method of claim 6, wherein the group of users to which none of the plurality of variants are displayed is associated with the first group of users.

8. The computer-implemented method of claim 1, wherein the providing each variant of the plurality of variants to the proportion of the first group of users comprises randomly assigning each variant to a user of the first group of users.

9. A system comprising:
at least one hardware processor; and
a memory storing instructions that, when executed by the at least one processor, cause the system to perform:
defining a communication item associated with a social networking system, including a plurality of parameters that are each associated with one or more possible values;
generating a plurality of variants of the communication item on the social networking system based on a full factorial combination of values associated with the plurality of parameters;
determining a first set of weights associated with the plurality of variants, each weight in the first set of weights associated with a variant of the plurality of variants;
providing each variant of the plurality of variants to a proportion of a first group of users that corresponds to a weight in the first set of weights associated with the variant;
obtaining data relating to performance of each variant on a corresponding proportion of the first group;
determining a second set of weights associated with the plurality of variants, each weight in the second set of weights associated with a variant of the plurality of variants and a weight in the first set of weights associated with the variant, wherein each weight in the second set is determined based on the associated weight in the first set of weights and the performance of the associated variant from the first group of users; and
providing each variant of the plurality of variants on the social networking system to a proportion of a second group of users that corresponds to a weight in the second set of weights associated with the variant.

10. The system of claim 9, wherein the determining the second set of weights associated with the plurality of variants is based on a probability of each variant optimizing a metric associated with the communication item, wherein the probability of each variant optimizing the metric is determined based on user engagement with the plurality of variants by the proportion of the first group of users.

11. The system of claim 10, wherein the obtaining data relating to the performance of the metric for the provided variant is based on the user engagement with the provided variant by the proportion of the first group of users associated with the provided variant.

12. A non-transitory computer readable medium including instructions that, when executed by at least one hardware processor of a computing system, cause the computing system to perform a method comprising:
defining a communication item associated with a social networking system, including a plurality of parameters that are each associated with one or more possible values;
generating a plurality of variants of the communication item on the social networking system based on a full factorial combination of values associated with the plurality of parameters;
determining a first set of weights associated with the plurality of variants, each weight in the first set of weights associated with a variant of the plurality of variants;
providing each variant of the plurality of variants to a proportion of a first group of users that corresponds to a weight in the first set of weights associated with the variant;
obtaining data relating to performance of each variant on a corresponding proportion of the first group;
determining a second set of weights associated with the plurality of variants, each weight in the second set of weights associated with a variant of the plurality of variants and a weight in the first set of weights associated with the variant, wherein each weight in the second set is determined based on the associated weight in the first set of weights and the performance of the associated variant from the first group of users; and
providing each variant of the plurality of variants on the social networking system to a proportion of a second group of users that corresponds to a weight in the second set of weights associated with the variant.

13. The non-transitory computer readable medium of claim 12, wherein the determining the second set of weights associated with the plurality of variants is based on a probability of each variant optimizing a metric associated with the communication item, wherein the probability of each variant optimizing the metric is determined based on user engagement with the plurality of variants by the proportion of the first group of users.

14. The non-transitory computer readable medium of claim 13, wherein the performance of the metric for the provided variant of the plurality of variants is based on the user engagement with the provided variant by the proportion of the first group of users associated with the provided variant.

* * * * *